(12) United States Patent
Williams et al.

(10) Patent No.: US 7,622,518 B2
(45) Date of Patent: Nov. 24, 2009

(54) POLYMER COMPOSITION AND METHOD OF MAKING THE SAME

(75) Inventors: Raymond F. Williams, Massillon, OH (US); Daniel L. Kinsinger, Canton, OH (US)

(73) Assignee: U.S. Technology Corporation, Canton, OH (US)

( * ) Notice: Subject to any disclaimer, the term of this patent is extended or adjusted under 35 U.S.C. 154(b) by 596 days.

(21) Appl. No.: 11/349,830

(22) Filed: Feb. 8, 2006

(65) Prior Publication Data

US 2006/0142435 A1 Jun. 29, 2006

Related U.S. Application Data (62) Division of application No. 10/392,043, filed on Mar. 19, 2003, now Pat. No. 7,037,969, which is a division of application No. 09/871,762, filed on Jun. 1, 2001, now Pat. No. 6,569,214.

(60) Provisional application No. 60/226,135, filed on Aug. 18, 2000, provisional application No. 60/208,624, filed on Jun. 1, 2000.

(51) Int. Cl.
*C08G 18/38* (2006.01)
(52) U.S. Cl. .................. 524/35; 524/430; 524/445
(58) Field of Classification Search .......... 524/35, 524/430, 445
See application file for complete search history.

(56) References Cited

U.S. PATENT DOCUMENTS

| | | |
|---|---|---|
| 4,731,125 A | 3/1988 | Carr |
| 4,947,591 A | 8/1990 | Risley |
| 5,112,406 A | 5/1992 | Lajoie et al. |
| 5,147,466 A | 9/1992 | Ohmori et al. |
| 5,160,547 A | 11/1992 | Kirschner et al. |
| 5,221,296 A | 6/1993 | Schwerzel et al. |
| 5,308,404 A | 5/1994 | Yam et al. |
| 5,316,587 A | 5/1994 | Yam et al. |
| 5,322,532 A | 6/1994 | Kurtz |
| 5,342,419 A | 8/1994 | Hibbard |
| 5,360,903 A | 11/1994 | Lane et al. |
| 5,367,068 A | 11/1994 | Lane et al. |
| 5,376,599 A | 12/1994 | Oshima et al. |
| 5,380,347 A | 1/1995 | Winston et al. |
| 5,427,710 A | 6/1995 | Stevens |
| 5,431,967 A | 7/1995 | Manthiram et al. |
| 5,489,318 A | 2/1996 | Erickson et al. |
| 5,552,469 A | 9/1996 | Beall et al. |
| 5,554,670 A | 9/1996 | Giannelis et al. |
| 5,698,624 A | 12/1997 | Beall et al. |
| 5,747,560 A | 5/1998 | Christiani et al. |
| 5,760,121 A | 6/1998 | Beall et al. |
| 5,780,619 A | 7/1998 | Lenz |
| 5,840,796 A | 11/1998 | Badesha et al. |
| 5,844,032 A | 12/1998 | Serrano et al. |
| 5,849,215 A | 12/1998 | Gin et al. |
| 5,849,830 A | 12/1998 | Tsipursky et al. |
| 5,871,555 A | 2/1999 | Wood |
| 5,876,812 A | 3/1999 | Frisk et al. |
| 5,877,248 A | 3/1999 | Beall et al. |
| 5,883,173 A | 3/1999 | Elspass et al. |
| 5,942,015 A * | 8/1999 | Culler et al. .................. 51/295 |
| 5,962,553 A | 10/1999 | Ellsworth |
| 5,972,448 A | 10/1999 | Frisk et al. |
| 6,034,164 A | 3/2000 | Elspass et al. |
| 6,337,046 B1 | 1/2002 | Bagrodia et al. |
| 6,569,214 B2 | 5/2003 | Williams et al. |

FOREIGN PATENT DOCUMENTS

GB 2261182 5/1993

OTHER PUBLICATIONS

Nanocor Inc. Technical Paper entitled, "An Emerging Family of Nonomer Nonoclays for Thermosets" by Tie Lan, copyright 1999 (exact date unknown).

Nanocor Inc. Technical Paper entitled, "Emerging Nanocomposite Technologies for Barrier and Thermal Improvement in PET Containers" by Karl Kamena, copyright 1999 (exact date unknown).

Nanocor Inc. publication entitled, "Product Lines" copyright 1999 (exact date unknown).

U.S. Air Force Office of Scientific Research paper entitled, "Polyhedral Oligomeric Silsequioxanes" dated Jul. 12, 2000.

* cited by examiner

*Primary Examiner*—Edward J Cain
(74) *Attorney, Agent, or Firm*—Sand & Sebolt (57) ABSTRACT

A method for making a polymeric blast media, and a product of this method. The first step involves blending a melamine compound with a cellulosic material and compression molding said first blend to produce a compression molded first blend. This first blend is then cooled and then ground. In the next step of this method, a urea compound is blended with a nano-clay material to produce a second blend and compression molded. This compression molded second blend is then ground to produce a particulate second blend. The particulate first blend is then blended with the particulate second blend. A blast media product of this method is also disclosed.

13 Claims, 10 Drawing Sheets

COMPOSITE SIDE

MELAMINE COMPOUND WITH 65-35 ALPHA CELLULOSE BLEND
COMPRESSION MOLDED
TEMPERATURE-280-330F 300-500 TONS PSI
GROUND TO 30/40 MESH SIZE

NANO-STRUCTURE SIDE

UREA COMPOUND BLENDED BY WEIGHT WITH 1/2% NANO SIZED
MONTMORILLONITE POLYMER GRADE CLAY
NANO STRUCTURED ADDITIVE CAN BE VARIED FROM 1/2% - 5%
COMPRESSION MOLDED TEMPERATURE - 280 - 330F
300 - 500 TONS PSI GROUND TO 40/60 MESH SIZE

BLENDING

COMPOSITE SIDE & NANO-STRUCTURED SIDE BLENDED 1:1
CREATING 30/60 MESH SIZE

COMPOSITE SIDE

MELAMINE COMPOUND BLENDED WITH 35% ALPHA CELLULOSE FIBER
COMPRESSION MOLDED AT:
TEMPERATURE – 280 TO 330 F
PRESSURE – 300 TO 500 TONS
GROUND TO 20/30 MESH SIZE AFTER MINIMUM 48 HOURS COOLING

TYPE III SIDE

TYPE III – MELAMINE
GROUND TO 30/40 MESH SIZE

TYPE VI SIDE

TYPE VI – ALLYLDIGLYCOL CARBONATE
GROUND TO 20/30 MESH SIZE

COMPOSITE SIDE, TYPE III SIDE
AND TYPE VI SIDE BLENDED
CREATING 20/40 MESH SIZE

NANO-STRUCTURE SIDE

UREA COMPOUND BLENDED BY WEIGHT WITH 1/2% NANO-SIZED MONTMORILLONITE
POLYMER GRADE CLAY
MONTMOILLONITE CLAY CAN BE VARIED FROM 1/2% TO 5% DEPENDING ON
APPLICATION
COMPRESSION MOLDED AT:
TEMPERATURE – 280 TO 300 F
PRESSURE – 300 TO 500 TONS
GROUND TO 10/20 MESH SIZE AFTER MINIMUM 48 HOURS COOLING

BLENDED TO 10/40 MESH SIZE

COMPOSITE / DENSE PARTICLE SIDE

MELAMINE COMPOUND BLENDED BY WEIGHT WITH 35% ALPHA CELLULOSE FIBER 230 GRIT ALUMINUM OXIDE OR 80 MINUS MESH GLASS OXIDE CULLET BLENDED 20% TO 30% BY WEIGHT DEPENDED ON APPLICATION
COMPROSSION MOLDED AT:
TEMPERATURE - 280 TO 330 F
PRESSURE - 300 TO 500 TONS
GROUND TO 30/40 MESH SIZE AFTER MINIMUM 48 HOURS COOLING

NANO-STRUCTURE SIDE

UREA COMPOUND BLENDED BY WEIGHT WITH 1/2% NANO-SIZED MONTMORILLONITE POLYMER GRADE CLAY
MONTMOILLONITE CLAY CAN BE VARIED FROM 1/2% TO 5% DEPENDING ON APPLICATION
COMPRESSION MOLDED AT:
TEMPERATURE - 280 TO 330 F
PRESSURE - 300 TO 500 TONS
GROUND TO 40/60 MESH SIZE

BLENDING

COMPOSITE / DENSE PARTICLE SIDE BLENDED WITH NANO-STRUCTURE SIDE 1:1 CREATING 30/60 MESH SIZE

POLYMER COMPOSITION AND METHOD OF MAKING THE SAME

CROSS REFERENCE TO RELATED APPLICATIONS

This application is a divisional application of U.S. patent application Ser. No. 10/392,043, filed Mar. 19, 2003, which is a divisional application of U.S. patent application Ser. No. 09/871,762, filed Jun. 1, 2001, now U.S. Pat. No. 6,569,214, which claims priority from U.S. Provisional Application Ser. No. 60/208,624, filed Jun. 1, 2000 and U.S. Provisional Application Ser. No. 60/226,135, filed Aug. 18, 2000; the disclosures of which are incorporated herein by reference.

BACKGROUND OF THE INVENTION

1. Technical Field

The present invention relates to polymer composite materials and more particularly to polymer composite materials used as abrasives and more particularly as a blast media. Still more particularly, this invention relates to the use of nano-structure composite materials as an abrasive and a blast media.

2. Background Information

Various methods and compositions are taught in the prior art for the stripping of organic coatings from an underlying metal or composite substrate by means of polymer abrasives. Such polymer abrasives have the advantage of being harder than the organic substrate but softer than the underlying substrate.

U.S. Pat. No. 4,731,125, for example, discloses a process whereby paint is removed from composites by blasting with urea-formaldehyde plastic particles having a Mohs scale hardness of 2.5-3.5 with a flow at a pressure of 40 lb/in$^2$.

U.S. Pat. No. 4,947,591 discloses a process whereby paint is removed by impact with particles of an acrylic-containing unsaturated polyester where the particles are ground from a cured mass so as to have at least 40 facets per particle.

U.S. Pat. No. 5,112,406 discloses a process for removing coatings from sensitive hard surface metal composite surfaces, masonry, stucco, plaster or wood by blasting the surfaces with a high velocity fluid stream containing water soluble crystalline sodium sulfate particles admixed with a hydrophobic silica or hydrophobic polysiloxane flow/anti-caking agent.

U.S. Pat. No. 5,160,547 discloses a process where the surfaces are blasted with water saturated compressed air stream under pressures of 10-150 psi using sodium bicarbonate particles having particle sized of 250-300 microns in admixture with a hydrophobic silica flow/anti-caking agent.

U.S. Pat. No. 5,147,466 discloses fine particles or oil films which are cleaned from the surface by bombarding it with fine frozen particles of water or other liquids such as glycerin carried in a stream of nitrogen cooled air under relatively low pressure.

U.S. Pat. No. 5,221,296 discloses abrasives based on finely divided abrasive particles bonded to one another and/or to a support by means of a binder, where the binder is the solid component of an aqueous polymer dispersion which is obtainable by polymerizing unsaturated monomers which can be polymerized by means of free radicals in the aqueous phase of a monosaccharide, oligosaccharide, polysaccharide, oxidatively, hydrolytically and/or enzymatically degraded polysaccharide, chemically modified monosaccharide, oligosaccharide or polysaccharide or a mixture of the above.

U.S. Pat. No. 5,308,404 discloses a process by which contaminants are removed from substrates by blast cleaning with a media containing abrasive particles obtained by compacting fine particles of the abrasive into larger particles having a hardness of 2-5 Mohs and wherein the abrasive can be water (soluble or insoluble) and is preferably sodium bicarbonate or calcium carbonate.

U.S. Pat. No. 5,316,587 discloses blast cleaning a solid surface which includes the steps of propelling an abrasive blast medium against a solid surface using a water-containing pressurized fluid stream to strip contaminants from the surface wherein the blast medium comprises water soluble abrasive particles and a surfactant.

U.S. Pat. No. 5,322,532 discloses a process for removing contaminants from a substrate comprising blast cleaning the substrate with composite abrasive particles formed by agglomerating particles of sodium bicarbonate with a aqueous binder solution of sodium carbonate.

U.S. Pat. No. 5,360,903 and U.S. Pat. No. 5,367,068 disclose a process whereby a surface is treated with particles of a glassy polysaccharide wherein the apparent hardness of the granules is between that of the coating and of the substrate and the granules are of starch, preferably wheat starch with dextrose equivalent less than 10, preferably unhydrolyzed.

U.S. Pat. No. 5,380,347 discloses a blast media for stripping contaminants from a solid surface comprising abrasive particles and a surfactant in the form of a granular surfactant-clathrate compound formed of a surfactant and a water soluble compound having clathration capability such as urea. The surfactant reduces the amount of water-soluble residues, which remain on the targeted surface and enhances the removal of dirt, grease and oil from the targeted surface.

U.S. Pat. No. 5,427,710 discloses a composition useful for removing polymeric coatings from flexible and inflexible surfaces which consists essentially of a conjugated terpene, an alcohol, a non-conjugated terpene, a surfactant and an organo-clay rheological additive.

U.S. Pat. No. 5,780,619 discloses a starch graft poly(meth) acrylate blast media which is effective in paint removal. The media is superior to a physical blend of the components (i.e., starch and acrylic polymers) and to wither a starch polymer or an acrylic polymer used singly. The hardness of the media is between 65-90 Shore D.

A need, however, exists for ways to improve the speed and effectiveness of such stripping procedures. A need also exists for ways of decreasing the breakdown rate of abrasives used for this purpose.

SUMMARY OF THE INVENTION

It is an object of the present invention to provide a polymeric blast media which efficiently and cost effectively removes organic coatings from substrates.

It is a further object of the present invention to provide a polymeric blast media which allows rapid removal of organic coatings from substrates.

It is a further object of the present invention to provide a polymeric blast media which can be used to remove standard organic coatings without substantial risk of damage to sensitive metal or composite substrates.

It is a further object of the present invention to provide a polymeric blast media which has a high degree of durability.

It is a still further object of the present invention to provide a polymeric blast media which has favorable surface roughness, almen arc, and water absorbence characteristics.

These and other objects are met by the present invention which is a method for making a polymeric blast media, and a product of this method. The first step involves blending a melamine compound with a cellulosic material and compression molding said first blend to produce a compression molded first blend. This first blend is then cooled and then ground. In the next step of this method, a urea compound is blended with a nano-clay material to produce a second blend and compression molded. This compression molded second blend is then ground to produce a particulate second blend. The particulate first blend is then blended with the particulate second blend.

In another preferred embodiment, a cross linked cast acrylic is ground to a particulate material and blended with the first and second blends.

In another preferred embodiment, the particles in the blast media are coated with a polyurethane coating.

In another preferred embodiment, a glass oxide or metal oxide dense particulate material is incorporated with the blast media.

The present invention also encompasses an abrasive media for the removal of coating or for the preparation of surfaces prior to coating or cleaning comprising a thermosetting polymer with an additive, wherein the additive has a major dimension and a minor dimension and said minor dimension is from about 1 nm to about 20 nm. The additive may be the nano-clay material, or alternatively may be a polyhedral oligomeric silsesquioxane material.

The present invention also encompasses a method of making a sanding pad for removing an organic coating from a substrate comprising the steps of blending a liquid polymeric material with a nano-clay material to produce a first blend, blending a cellulosic material with said first blend to produce a second blend. This second blend is then extruded to form a continuous sheet of abrasive material into a plurality of individual pads.

The blast media of this invention may be used for removal of standard aerospace coatings such as epoxy primers and polyurethane topcoats from very sensitive metal or composite substrates with better efficiency than was previously available. This media coating can be removed at accelerated speeds as compared to prior art blast media. The safety factor of this media on thin skin aluminum or composite surfaces is high. Coatings can be removed with virtually no damage to such substrates, leaving protective coatings such as cladding and anodizing intact. Also, the durability of this media helps to maintain economic feasibility in large-scale aerospace applications. Various different embodiments of this media address specific applications related to the aerospace industry and industry in general. All of these embodiments make use of nanometer-sized montmorillonite clay particles, which improve surface integrity and provide advantages in the mechanical and thermal properties of the polymer. These results are achieved with no increase in specific gravity due to the very low amounts of nano-particle needed, i.e. between ½% and 5% by weight. These results demonstrate that the overall increase in efficiency of this media is three to four times faster than unfilled polymer while the durability has more than doubled.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

DESCRIPTION OF THE PREFERRED EMBODIMENTS

Figure 1:
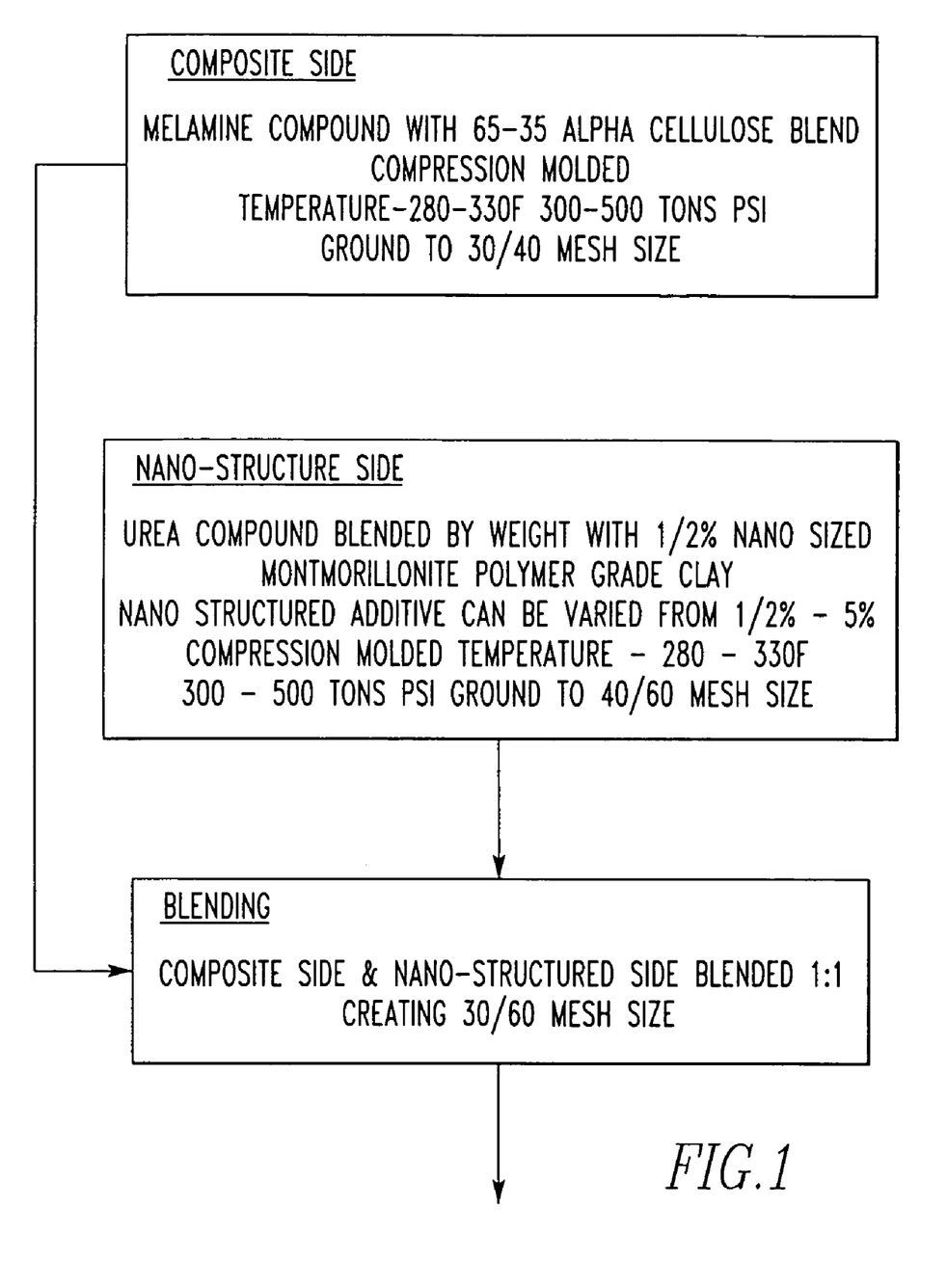
FIG. 1 is a flow diagram illustrating the manufacture of a blast media composition representing a preferred embodiment of the present invention.

Referring to FIG. 1, the composite side of the composition is prepared by mixing a melamine compound with from 35% to 65% of an alpha cellulose blend and compression molding the same at temperatures of a range of 280° F.-330° F. and pressures of 300 tons psi-500 tons psi (per square inch). The resulting composition is ground to 30/40 mesh size. The nano-structure side is prepared by blending a urea compound with ½% nano-sized montmorillonite polymer grade clay. The nano-structure additives may be varied from ½%-5% depending on application. This composition is compression molded at a temperature from 280° F.-330° F. and at a pressure of 300 tons psi-500 tons psi. The resulting compression molded composition is ground to 40/60 mesh size. The composite side and the nano-structure side are then blended in a 1:1 proportion creating 30/60 mesh size. In the use of composition manufactured in this way, a ½ inch double Venturi nozzle is employed using a flow rate of from 600 lbs.-1,000 lbs./hr. at a 45° angle with a 15-18 inch standoff. For aerospace applications, pressure should not exceed 30 psi or for aluminum ALCLAD pressure should be 25 psi and for bare aluminum pressure should be 30 psi.

Figure 2:
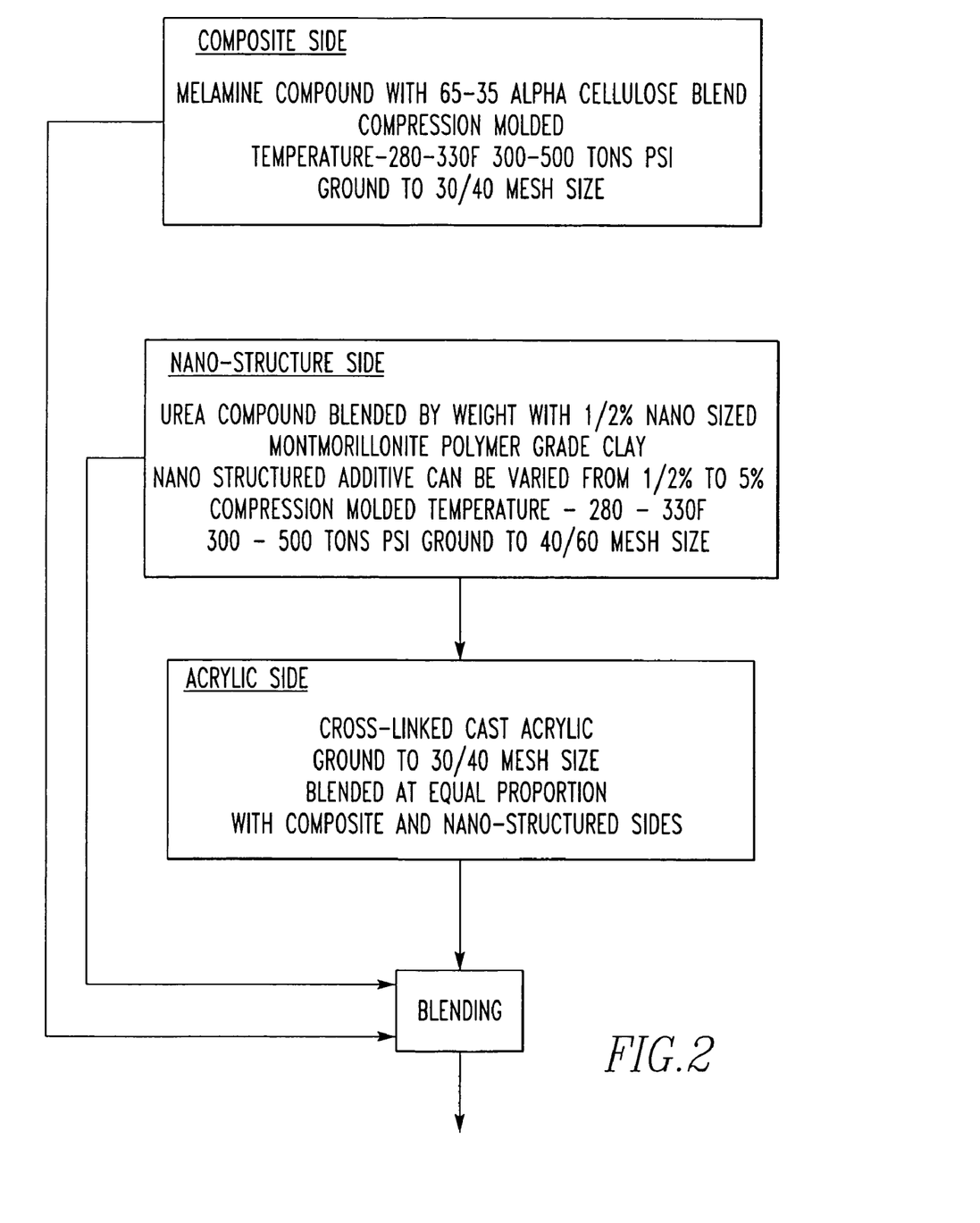
FIG. 2 is a flow diagram illustrating the manufacture of a blast media composition representing an alternate preferred embodiment of the present invention with a ground cross linked cast acrylic component.

Referring to FIG. 2, the composite side in an alternate embodiment is a melamine compound mixed with from 35% to 65% of an alpha cellulose blend that is compression molded at a temperature of about 280° F.-330° F. and at a pressure of from 300 tons psi-500 tons psi and then ground to 30/40 mesh size.

The nano-structure side is prepared by blending a urea compound with ½% by weight nano-size montmorillonite polymer grade clay. This nano-structured additive can be varied from ½% to 5% and is compression molded at a temperature of about 280° F.-330° F. and at a pressure of from 300 tons psi-500 tons psi and then cooled and ground to 40/60 mesh size.

An acrylic side is prepared by grinding a cross-linked cast acrylic to 30/40 mesh size and blending the same at equal proportions with the composite and nano-structure side. This composition is used with a ½ inch double Venturi nozzle at a flow rate of 600 lbs.-1000 lbs./hr, at a 45°-60° angle from the horizontal. For aerospace applications 30 psi was not exceeded with 25 psi being used at aluminum ALCLAD and 30 psi on bare aluminum. For composites, pressures were 15 psi-30 psi, This media is particularly useful in the removal of aerospace coatings from sensitive and thin substrates in which the safety of the substrate is an important concern. Again the nano-sized montmorillonite clay is incorporated into the composite side and a third side of cross-linked cast acrylic is added. The purpose of the cross-linked acrylic is to lighten the specific gravity of the media thus lowering the media weight affecting the surface upon impact under pressure. This media also remains sharp as it fractures while downsizing in the blasting process. This media is safe on substrates that have been very difficult to de-paint in the past such as KEVLAR composite polymer, lightning strike surfaces or very thin-skinned aluminum.

Figure 3:
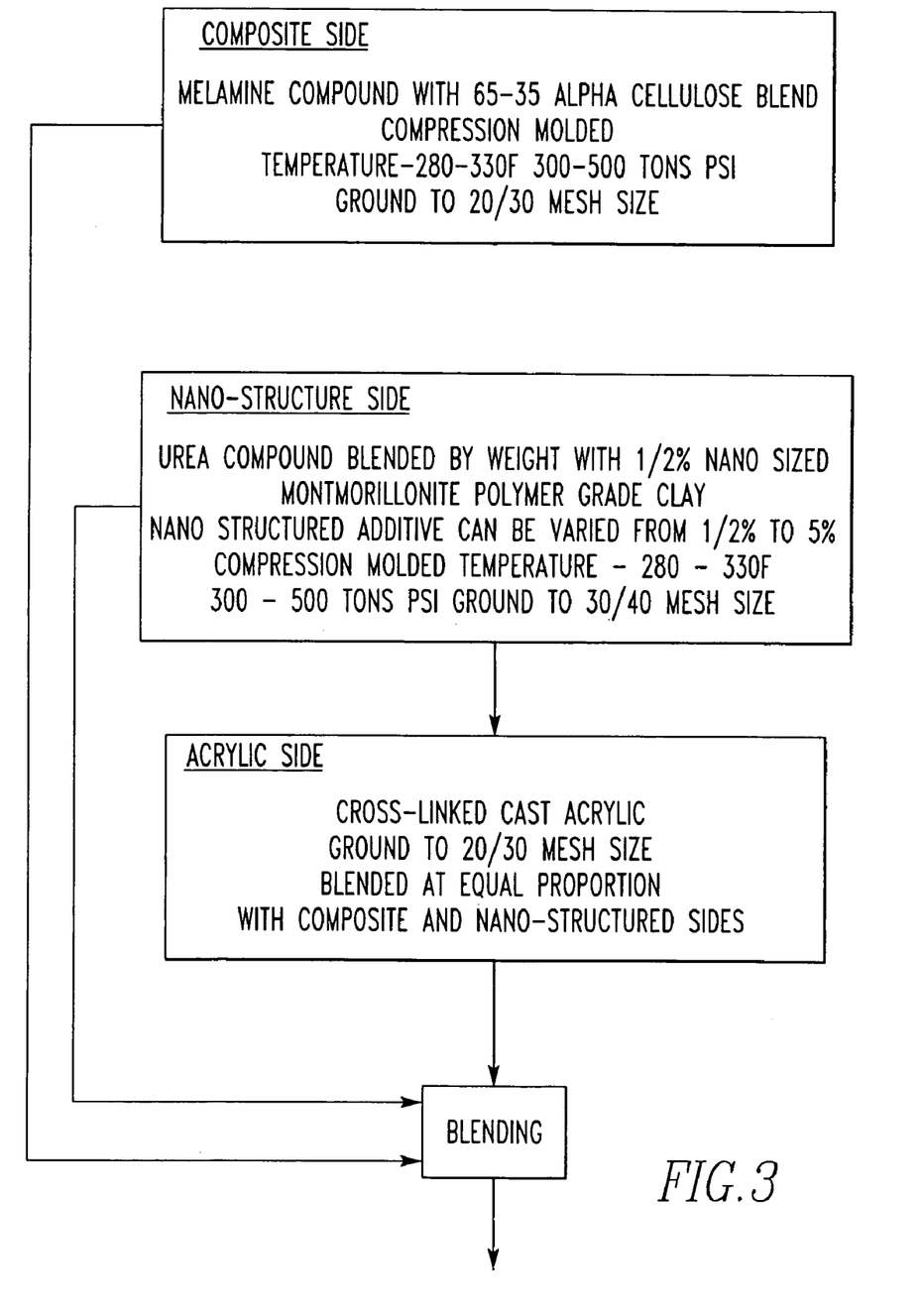
FIG. 3 is a flow diagram flow diagram illustrating the manufacture of a blast media composition representing an alternate preferred embodiment of the present invention with another ground cross linked cast acrylic component.

Referring to FIG. 3, the composite side in an alternate embodiment is a melamine compound mixed with from 35% to 65% of an alpha cellulose blend that is compression molded at a temperature of about 280° F.-330° F. and at a pressure of from 300 tons psi-500 tons psi (per square inch) and then ground to 20/30 mesh size.

The nano-structure side is prepared by blending a urea compound with ½% by weight nano-size montmorillonite polymer grade clay. This nano-structured additive can be varied from ½% to 5% and is compression molded at a temperature of about 280° F.-330° F. and at a pressure of from 300 tons psi-500 tons psi and then cooled and ground to 30/40 mesh size.

An acrylic side is prepared by grinding a cross-linked cast acrylic to 20/30 mesh size and blending the same at equal proportions with the composite and nano-structure side. This composition is used with a ½ inch double Venturi nozzle at a flow rate of 600 lbs.-1000 lbs./hr, at a 45°-60° angle from the horizontal. For aerospace applications 30 psi was not exceeded with 25 psi being used at aluminum ALCLAD and 30 psi on bare aluminum. For composites, pressures were 15 psi-30 psi.

Figure 4:
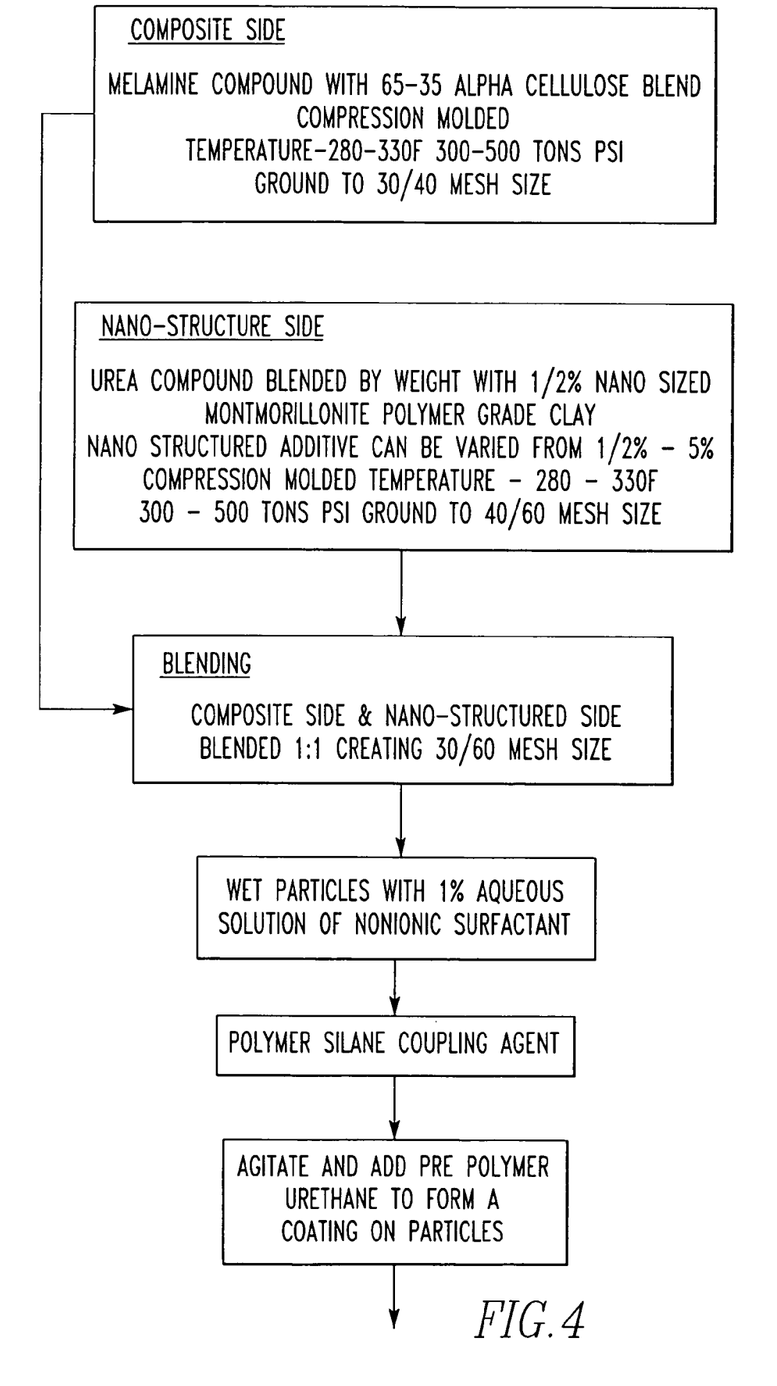
FIG. 4 is a flow diagram illustrating the manufacture and use of a composition representing an alternate preferred embodiment of the present invention in which a polyurethane coating is applied to the particles.

Referring to FIG. 4, the composite side is prepared by blending a melamine compound with 65-35% of an alpha cellulose blend, which is compression molded at a temperature about 280° F.-330° F. and at a pressure of from 300 tons psi-500 tons psi (per square inch) and then ground to 30/40 mesh size after cooling. The nano-structure side is prepared by blending a urea compound with ½% by weight nano-size montmorillonite polymer grade clay. The nano-structure additive can be varied from ½% to 5%. The blend is compression molded from about 280° F.-330° F. and at a pressure of from 300 tons psi-500 tons psi. The nano-structure is ground to 40/60 mesh size. Particles in this nano-structure side are then mixed with the composite side, at a 1:1 ratio, to provide a 30/60 mesh size. This nano-structure/composite blend is then wetted with a 1% aqueous solution of a nonionic surfactant. The blend is then mixed with a silane liquid polymer coupling agent. The mixture is then agitated and a pre-polymer urethane is added to form a polyurethane coating on the particles. Further relevant information concerning the application of a polyurethane coating on particles may be contained in U.S. Pat. No. 5,405,648, the contents of which are incorporated herein by reference.

Figure 5:
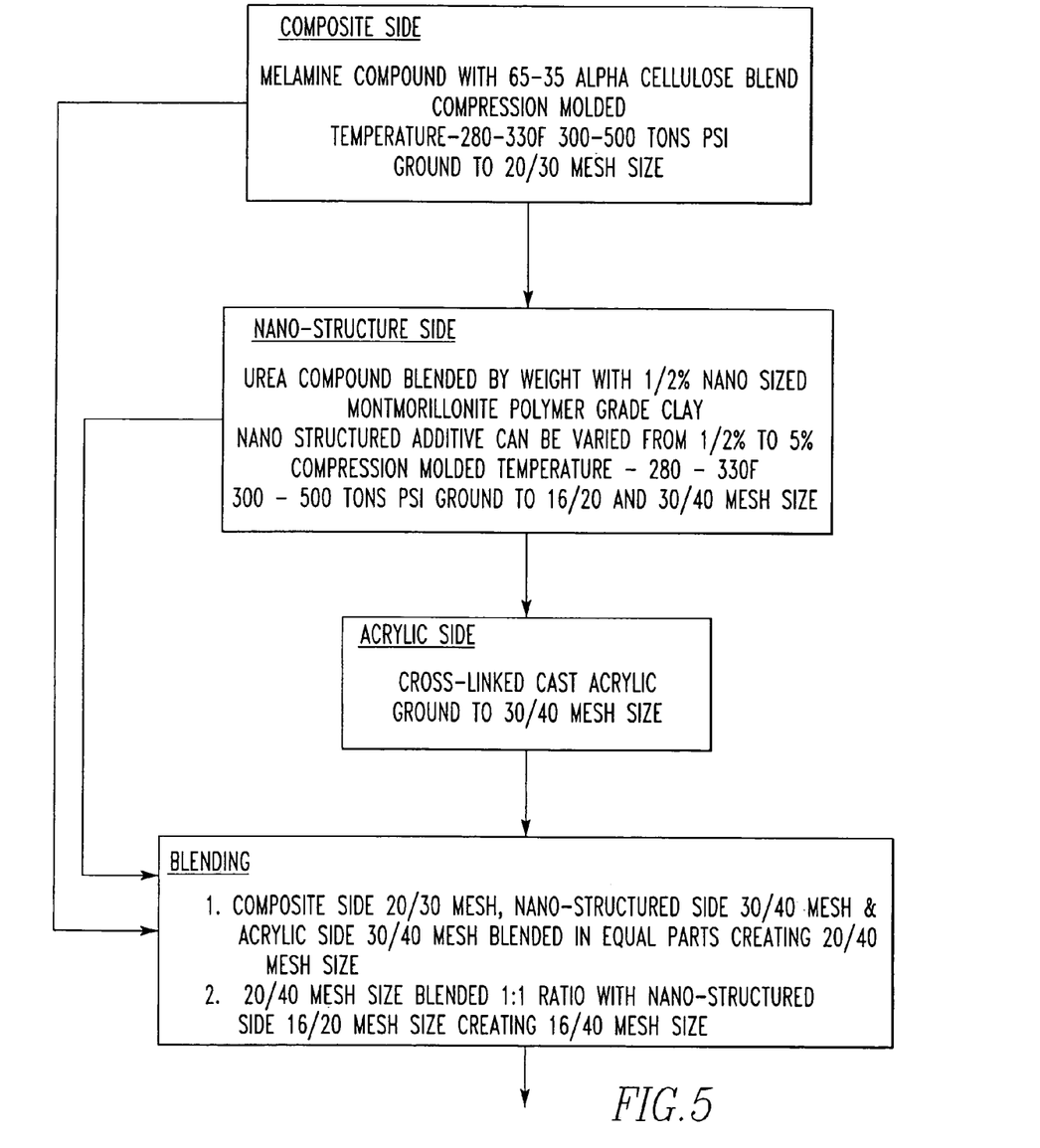
FIG. 5 is a flow diagram illustrating the manufacture and use of a composition representing still another alternate preferred embodiment of the present invention in which the acrylic component is added in a different way.

Referring to FIG. 5, the composite side is prepared by blending a melamine compound with from 35% to 65% of an alpha cellulose blend that is compression molded at a temperature about 280° F.-330° F. and at a pressure of from 300 tons psi-500 tons psi and then to 20/30 mesh size after cooling. The nano-structure side is prepared by blending a urea compound with 12% by weight nano-size montmorillonite polymer grade clay. The nano-structure additive can be varied from ½% to 5% depending on application. The blend is compression molded from about 280° F.-330° F. and at a pressure of from 300 tons psi-500 tons psi. The nano-structure side is ground into two separate portions, one being 16/20 mesh size and the other being 30/40 mesh size. A cross-linked cast acrylic is ground to 30/40 mesh size. The composite side 20/30 mesh, nano-structured side 30/40 mesh and acrylic side 30/40 mesh are blended in equal parts creating a 20/40 mesh size. The 20/40 mesh size is then blended in a 1:1 ratio with nano-structure side 16/20 mesh size creating a 16/40 mesh size. This composition is preferably used with a ⅜ inch double Venturi nozzle at a flow rate of 600 lbs./hr. at an angle of 600-800 from a horizontal. Ordinarily, pressures greater than 30 psi would not be used. This media is found to be particularly adapted for fast and safe removal of epoxy and polyurethane coatings used on aircraft wheels.

Figure 6:
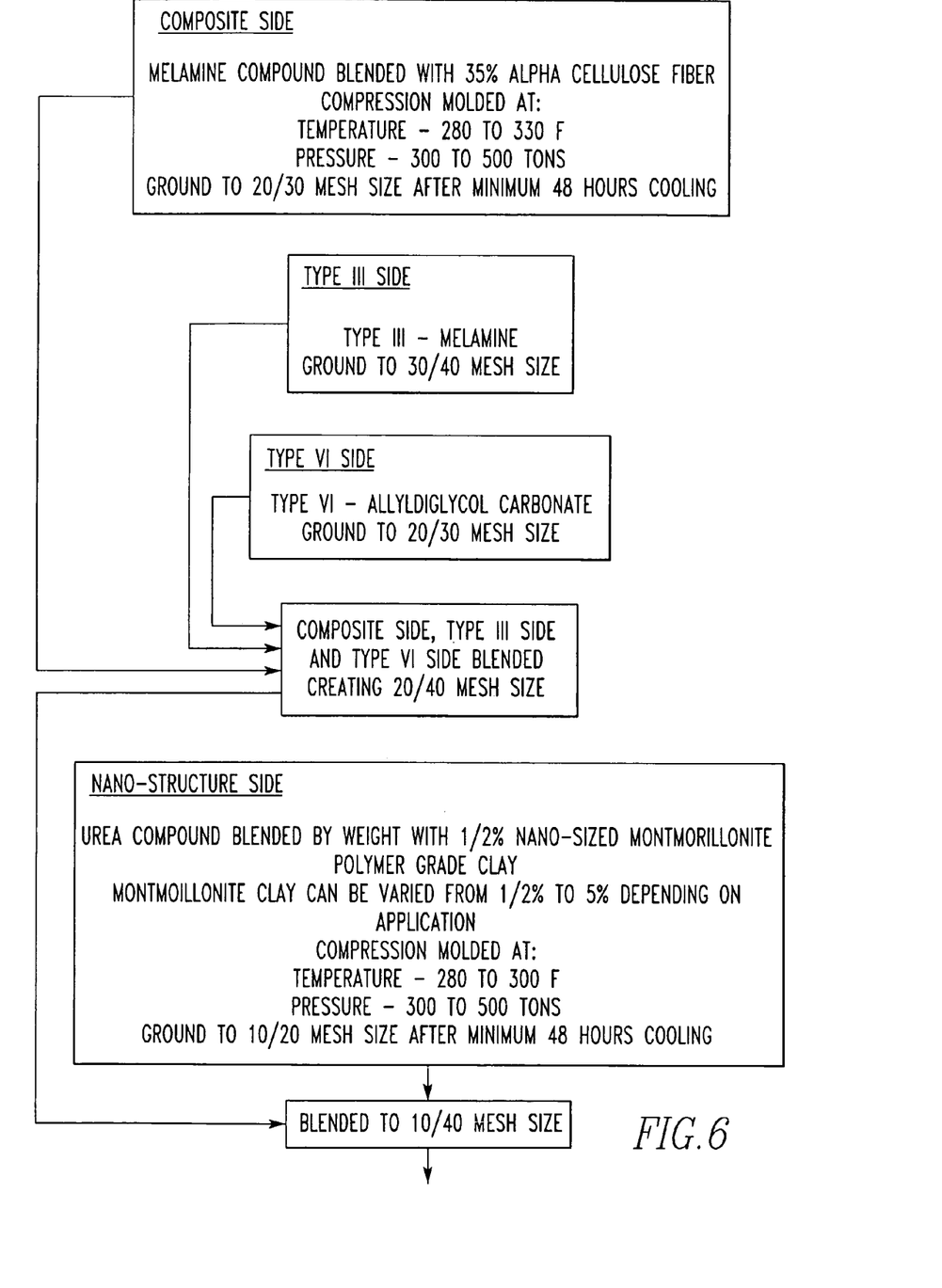
FIG. 6 is a flow diagram illustrating the manufacture and use of a composition representing an alternate preferred embodiment of the present invention in which a Type III melamine composition and a Type VI allyidiglycol carbonate composition is included in the composite side.

Referring to FIG. 6, the composite side is prepared by blending a melamine compound with 35% of an alpha cellulose blend, which is compression molded at a temperature about 280° F.-330° F. and at a pressure of from 300 tons psi-500 tons psi (per square inch) and then to 20/30 mesh size after 48 hours cooling. Also blended with the composite side is a Type III melamine compound ground to 30/40 mesh size and a Type VI allyldiglycol carbonate ground to 20/30 mesh size. The composite side, Type III side, and Type VI side compositions are blended in equal amounts to provide a 20/40 mesh size blended composition. The Type III and Type VI compositions are defined in MILSPEC 85891A. The nano-structure side is prepared by blending a urea compound with ½% by weight nano-size plus montmorillonite polymer grade clay. The nano-structure additive can be varied from ½% to 5% depending on application. The blend is compression molded from about 280° F.-330° F. and at a pressure of from 300 tons psi-500 tons psi, and is ground to 10/20 mesh size after 48 hours cooling. The 20/40 mesh size blended composition is then blended in a 1:1 ratio with the nano-structure side 10/20 mesh size, thereby creating a 10/40 mesh size composition. This composition is preferably used with a ⅜ inch double Venturi nozzle at a flow rate of 600 lbs./hr. at an angle of 80° from a horizontal. Ordinarily, pressures greater than 30 psi would not be used. This media is found to be particularly adapted for fast and save removal of epoxy and polyurethane coatings used on aircraft wheels.

The media described in connection with FIGS. 5 and 6 are particularly useful for the fast and safe removal of aerospace coatings used on aircraft wheels, landing gear and cast aluminum parts where exposure to high heat has made coating removal very difficult. The hardness of such coatings is elevated due to the extreme temperature exposure. These coatings can be removed very quickly because of the nano-composite structure incorporated in this media. The protective anodized coating used on these parts is left totally intact due to the speed of the de-paint process.

Figure 7:
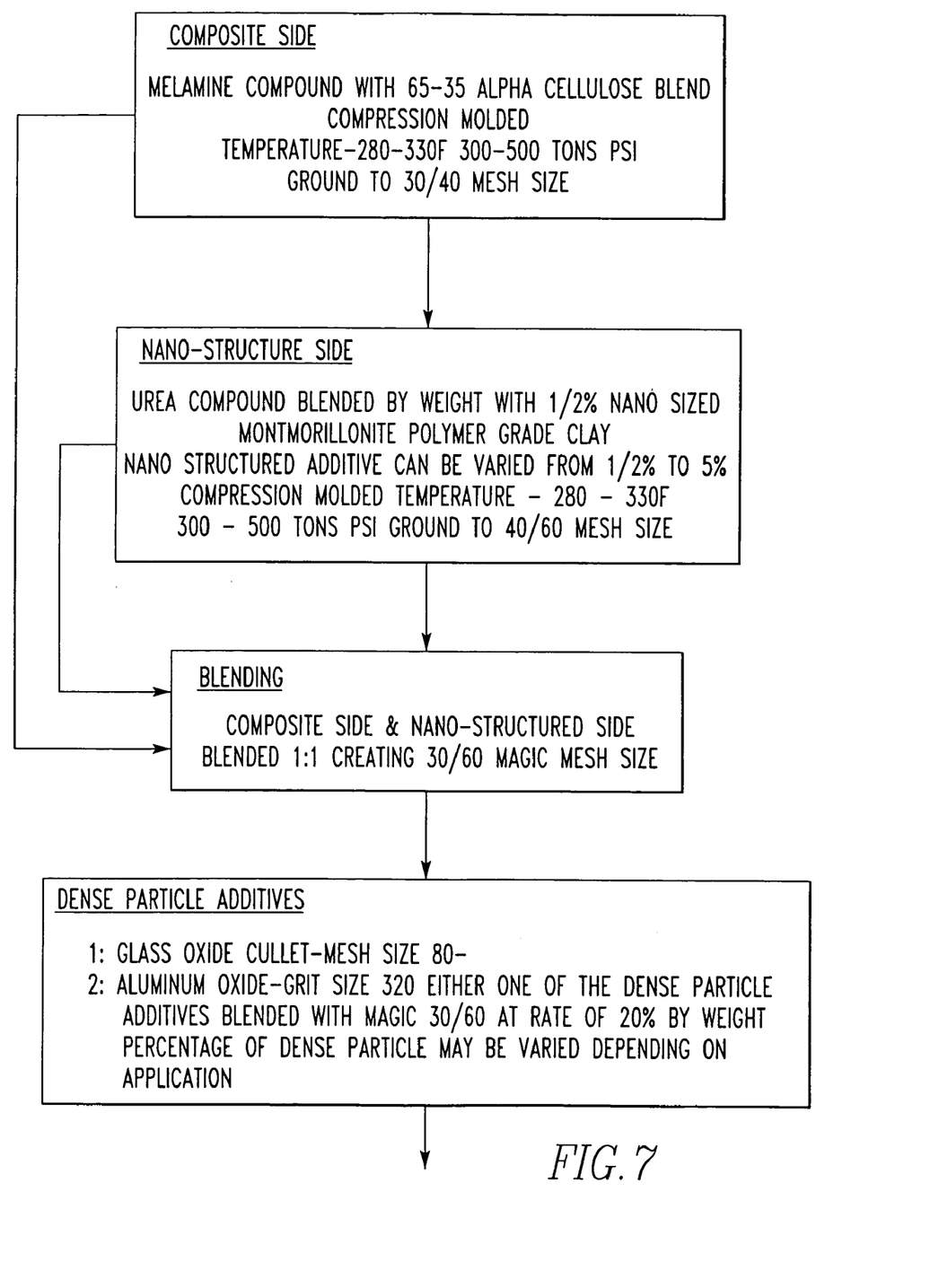
FIG. 7 is a flow diagram illustrating the manufacture of a blast media composition representing still another alternate preferred embodiment of the present invention in which dense glass oxide or metal oxide particles are added.

Referring to FIG. 7, a composite side of the media is a melamine compound blended with from 35% to 65% of an alpha cellulose blend that is compression molded at temperatures from 280° F.-330° F. and 300 tons psi-500 tons psi (per square inch). The nano-structure side is a urea compound blended with ½% by weight nano-sized montmorillonite polymer grade clay. The nano-structure additive can be varied from ½%-5% depending on application and the nano-structure side is compression molded at temperatures from 280° F.-330° F. at a pressure of from 300 tons psi-500 tons psi. The nano-structure side composition is cooled and ground to 40/60 mesh size. The composite side and the nano-structure side are blended at a ratio of 1:1 creating a 30/60 mesh size. Dense particle additives, which may be selected from glass oxide cullet of a mesh size −80 or aluminum oxide of a grit size 320. Either one of the dense particle additives are blended with the 30/60 mesh size media at a rate of 20% by weight. The percentages of the dense particles may be varied, depending upon a particular application. This media is preferably used with a ½ inch double Venturi nozzle at a flow rate of 600 lbs./hr.-1,000 lbs./hr at a 45 degree angle with a 15/18 inch standoff. Ordinarily, pressures of 25 psi on aerospace applications would not be exceeded. This media is found to be well adapted for fast and safe removal of heavier epoxy and polyurethane coatings used in the aerospace industry. Microfine dense particle additives increase strip rate, decreasing dwell time on the surface thus eliminating damage to sensitive substrates.

Figure 8:
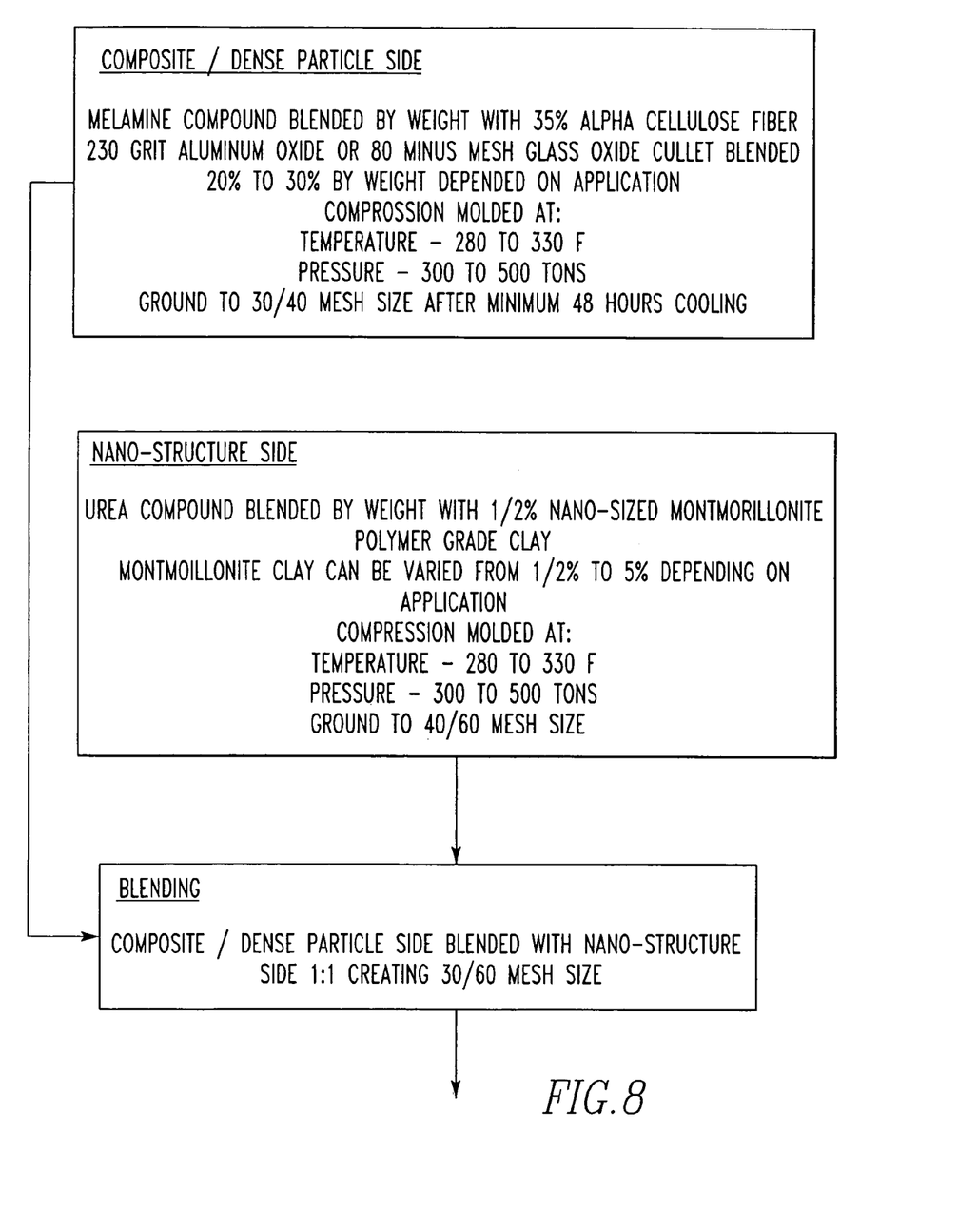
FIG. 8 is a flow diagram illustrating the manufacture of a blast media composition representing an alternate preferred embodiment of the present invention in which dense particles are added in another way.

Referring to FIG. 8, a composite side of the media is a melamine compound blended with a 35% alpha cellulose blend that is compression molded at temperatures from 280° F.-330° F. and pressures from 300 tons psi-500 tons psi (per square inch). In this embodiment, a dense particle additive, which could be glass oxide cullet of a −80 mesh size or aluminum oxide of grit size 320, is added to the melamine and alpha cellulose blend. The melamine and alpha cellulose blend is ground to 30/40 mesh size and either of these dense particle additives are blended in the amount of from 20% to 30% by weight although this amount may vary depending on application. The nano-structure side is a urea compound blended with ½% by weight nano-sized montmorillonite polymer grade clay. The nano-structure additive can be varied from ½%-5% depending on application. The nano-structure side is compression molded at temperatures from 280° F.-330° F. at a pressure of from 300 tons psi-500 tons psi. The composition is cooled and ground to 40/60 mesh size. The composite/dense particle side and the nano-structure side are blended at a ratio of 1:1 creating a 30/60 mesh size. This media is preferably used with a ½ inch double Venturi nozzle at a flow rate of 600 lbs./hr.-1,000 lbs./hr at a 45 degree angle with a 15/18 inch standoff. Ordinarily, pressures of 25 psi on aerospace applications would not be exceeded. This media is found to be well adapted for fast and safe removal of heavier epoxy and polyurethane coatings used in the aerospace industry. Microfine dense particle additives increase strip rate, decreasing dwell time on the surface thus eliminating damage to sensitive substrates.

The media described in connection with FIGS. 7 and 8 are particularly useful for the fast and safe removal of extra heavy or multi-layered coatings used in the aerospace industry. Micro-fine dense particle additives are used to increase strip rates, decreasing dwell time on the surface, thus eliminating damage or impinging stress on sensitive substrates. Again the use of nano-sized montmorillonite clay is essential to the polymer by increasing the durability of the polymer and eliminating rapid attrition due to the aggressive nature of the dense particle additives. The presence of the polymer with the dense particle additive also behaves as a buffer not allowing the dense particle additive to become too aggressive on the substrate. This media is very effective on heavier coatings such as Radar Absorbent Material (RAM).

Figure 9:
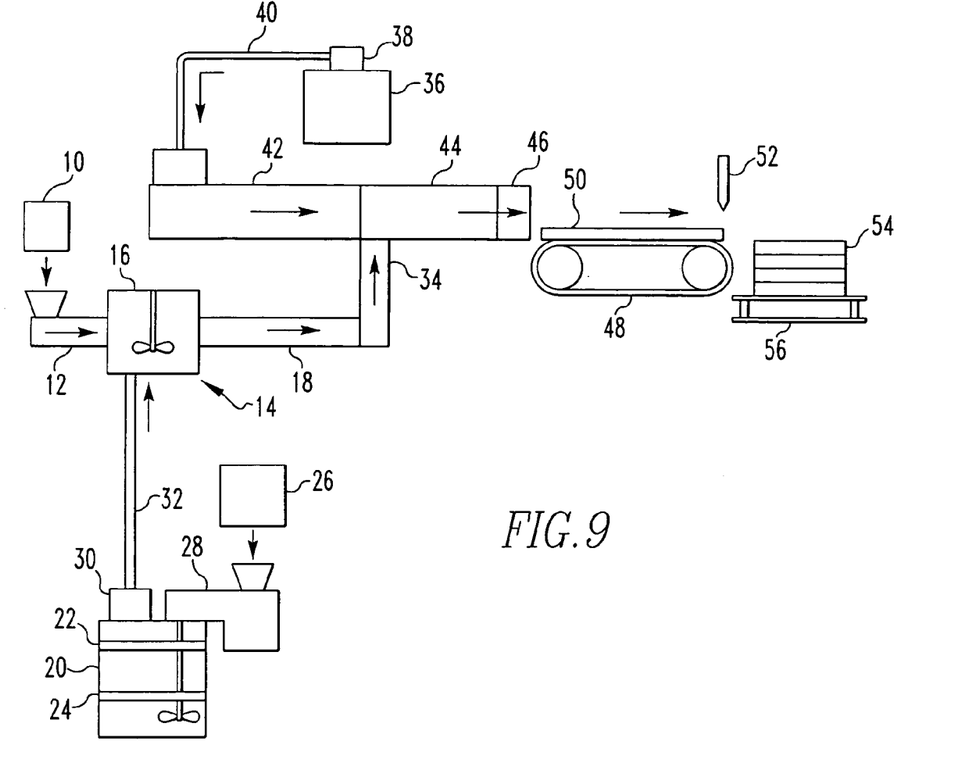
FIG. 9 is a schematic diagram showing the apparatus used in a method for manufacturing a sanding pad incorporating another preferred embodiment of the present invention.

Referring to FIG. 9, a method and apparatus for making a sanding pad is shown. Aluminum oxide grit 10 is introduced to grit feeder 12 to a Acrison blender shown generally at numeral 14 which includes an Intrometer variable speed mixer 16 and a metering auger 18. There is also a polymer drum 20 which is equipped with a top heating band 22 and a bottom heating band 24. Nano-sized montmorillonite clay 26 is introduced to drum blender 28 to polymer drum to form a polymer and nano-sized montmorillonite clay blend in the polymer drum 20 which is removed by polymer pump 30 in line 32 to the Acrison blender 14. The blended polymer is removed from the Acrison blender 14 in the meter auger 18 to vertical auger 34. A cellulose and water mixture is removed from container 36 by pump 38 in line 40 to extruder 42 to forming conveyor 44 where the cellulose and water mixture is mixed with the polymer blend from vertical auger 34 and is then foam extruded from die 46 onto continuous conveyor belt 48. At the end of the conveyor belt 48 the extruded material 50 is cut by vertical knife 52 into segments as at segment 54 which are stacked for cooling on pallet 56.

Figure 10:
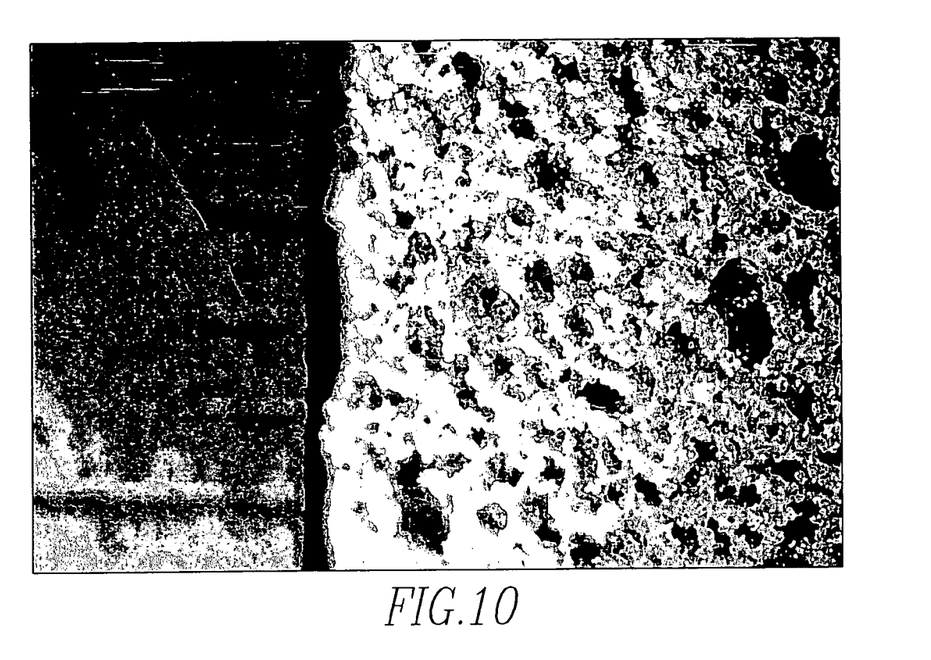
FIG. 10 is a photograph showing a perspective magnified view of a sanding pad made with the apparatus shown in FIG. 9.

Referring to FIG. 10, a magnified photograph of the product of the method of making the sanding pad as described above is shown. The resulting cellular structure of the sanding pad is illustrated with reference to the rule shown in which the marks shown are ⅛ inch apart.

Figure 11:
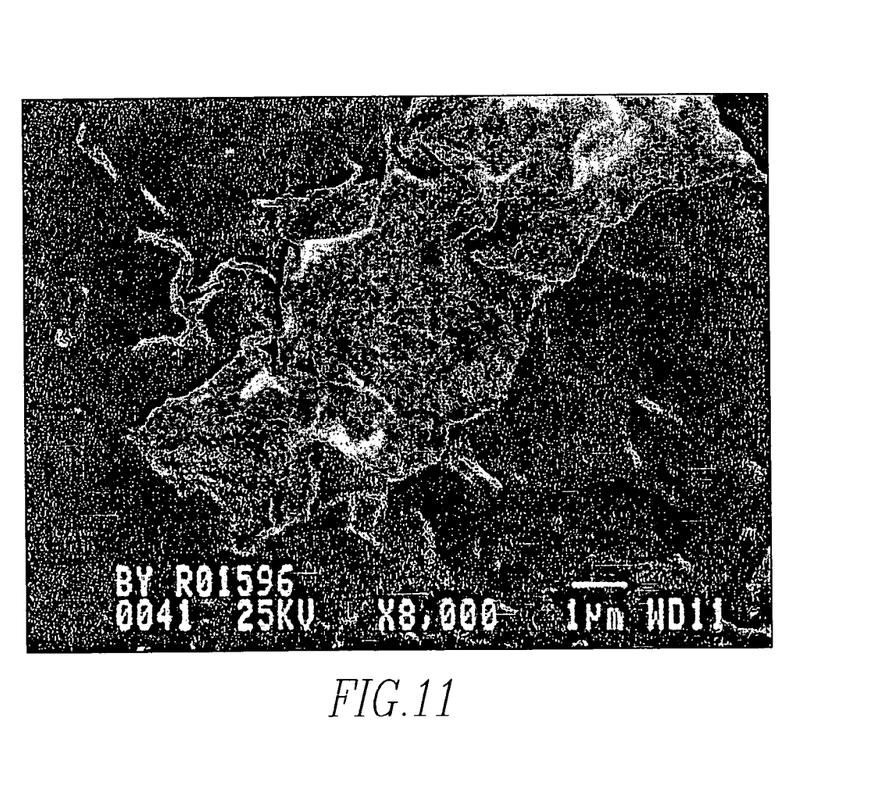
FIG. 11 is a photograph showing a perspective magnified view of a nano-sized montmorillomite clay polymer grade class particle used in the blast media of the present invention.

Referring to FIG. 11, a magnified photograph of a nano-sized montmorillonite polymer grade clay particle is shown. Such particles are generally platelet shaped. These particles have a major dimension which will generally be in the range of about 100 nm to almost 1,000 nm. These particles also have a minor dimension which will generally be in the range of about 1 nm to about 20 nm.

It will be understood that other nano-sized additives and fillers may be substituted for the nano-sized montmorillonite polymer grade clay in the practice of this invention. One such suitable nano-sized additive are polyhedral oligomeric silsesquioxane additives which are commercially available from Hybrid Plastics located at 18237 Mt. Baldy Circle, Fountain Valley, Calif. 92708-6117 USA.

In making the blast media as described above, it will be understood that other thermoplastic polymers may be substituted for the melamine. For example, suitable thermosetting polymers include urea formaldehyde, phenal formaldehyde, polyester, polyurethane, and epoxy.

the methods and compositions of the present invention are further illustrated by the following examples.

EXAMPLES

Example 1

FIG. 1

The powdered melamine compound commercially available from British Industrial Plastics (BIP) under tradename/product number Melmex MFB 10/B11 was blended with 65.35 by weight alpha cellulose which is commercially available from J. Rettenmaier USA LP (JRS) under tradename/ product number ARBOCEL/BWW40 and compression molded at a temperature of 300° F. at a pressure of 500 tons psi. The resulting mixture was allowed to cool for 1 Day and was then ground in a Reduction Engineering disc mill grinder to a 30/40 mesh size. Separately a urea compound commercially available from BIP under tradename/product number Beetle GXT UF A-10 in the amount of 1,000 grams was blended by weight with nano-sized montmorillonite polymer grade clay commercially available from Nanocor, Inc. under tradename/product number Polymer Grade Montmorillonite Nanomer PGV in the amount of 10 grams. The resulting blend was compression molded at a temperature of 300° F. and a pressure of 500 tons psi in a hydraulic compression molding press. The blend was allowed to cool for 1 day and was then ground to a 40/60 mesh size. 1,000 grams of the composite side component described above was mixed with 1,000 grams of the nano-structure side.

Example 2

FIG. 2

The powdered melamine compound commercially available from BIP under tradename/product number Melmex MF B10/B11 was blended with 65/35 by weight alpha cellulose which is commercially available from JRS under tradename/ product number Arbocel/BWW40 and compression molded at a temperature of 300° F. at a pressure of 500 tons psi. The resulting mixture is allowed to cool for 1 day and was then ground in a Reduction Engineering disc mill grinder to a 30/40 mesh size. Separately a urea compound commercially available from BIP under tradename/product number Beetle GXT UF A-10 in the amount of 1,000 grams was blended by weight with nano-sized montmorillonite polymer grade clay commercially available from Nanocor, Inc. under tradename/ product number Nanomer PGV in the amount of 10 grams. The resulting blend was compression molded at a temperature of 300° F. and a pressure of 500 tons psi in a hydraulic compression molding press. The blend was allowed to cool for 1 day and was then ground to a 40/60 mesh size. 1,000 grams of the composite side component described above was mixed with 1,000 grams of the nano-structure side. A cross-linked cast acrylic commercially available from Aristech Corp. under the tradename/product number Acrylic 1-300 was ground 30/40 mesh size and blended at equal proportion with the composite and nano-structure side.

Example 3

FIG. 3

The powdered melamine compound commercially available from BIP under tradename/product number Melmex MF B10/B11 was blended with 65/35 by weight alpha cellulose which is commercially available from JRS under tradename/ product number Arbocel/BWW40 and compression molded at a temperature of 300° F. at a pressure of 500 tons psi. The resulting mixture is allowed to cool for 1 day and was then ground in a Reduction Engineering disc mill grinder to a 20/30 mesh size. Separately, a urea compound commercially available from BIP under tradename/product number Beetle GXT UF A-10 in the amount of 1,000 grams was blended by weight with nano-sized montmorillonite polymer grade clay commercially available from Nanocor, Inc. under tradename/ product number Nanomer PGV in the amount of 10 grams. The resulting blend was compression molded at a tempera-ture of 300° F. and a pressure of 500 tons psi in a hydraulic compression molding press. The blend was allowed to cool for 1 day and was then ground to a 40/60 mesh size. 1,000 grams of the composite side component described above was mixed with 1,000 grams of the nano-structure side. A cross linked cast acrylic commercially available from Aristech Corp. under the tradename/product number Acrylic 1-300 was ground 30/40 mesh size and blended at equal proportion with the composite and nano-structure side.

Example 4

FIG. 4

The powdered melamine compound commercially available from BIP under tradename/product number Melmex MF B10/B11 is blended with 65-35% by weight alpha cellulose which is commercially available from BIP under tradename/ product number Beetle GXT UF A-10 in the amount of 1,000 grams is blended by weight with nano-sized montmorillonite polyer grade clay commercially available from Nanocor, Inc. under tradename/product number Nanomer PGV in the amount of 10 grams. The resulting blend is compression molded at a temperature of 300° F. and a pressure of 500 tons pi in a hydraulic compression molding press. The blend is allowed to cool for 1 day and was then ground to a 40/60 mesh size. 1,000 grams of the composite side component described above was mixed with 1,0000 grams of the nano-structure side. A cross-linked cast acrylic commercially available from Aristech Corp. under the tradename/product number Acrylic I-300 is ground 30/40 mesh size and blended at an equal proportion with the composite and nano-structure side. Grams of particles in this blend were then introduced to a tank which was then filled with a water surfactant mixture. The surfactant is a non-ionic surfactant commercially available from the B.A.S.F. Company under the tradename/product number F88. The surfactant is used in a 1% by weight concentration in water. The particles are then agitated. The water is then removed and the particles are treated with a silane liquid polymer coupling agent available. The mixture is then agitated and a liquid pre-polymer urethane available from Blend Manufacturing, Inc. of Somersworth, N.H. USA under the tradename/product number MATRIX was added. The ratio by weight of the silane coupling agent to the urethane pre-polymer is 1:10.07. The resulting film on the particles is allowed to dry.

Example 5

FIG. 5

The powdered melamine compound commercially available from BIP under tradename/product number Melmex MF B01/B11 was blended with 65-35 by weight alpha cellulose which is commercially available from JRS under tradename/ product number Arbocell/BWW40 and compression molded at a temperature of 300° F. at a pressure of 500 tons psi. The resulting mixture was allowed to cool for 1 day and was then ground in a Reduction Engineering Disc mill grinder to a 20/30 mesh size. Separately, a urea compound commercially available from BIP under tradename/product number Beetle GXT UF A-10 in the amount of 1,000 grams was blended by weight with nano-sized montmorillonite polymer grade clay commercially available from Nanocor, Inc. under tradename/ product number Nanomer PGV in the amount of 10 grams. The resulting blend was compression molded at a tempera-ture of 300° F. and a pressure of 500 tons psi in a Hydraulic compression molding press. The blend was allowed to cool for 1 day and was then ground to 16/30 and 30/40 mesh size. A cross-linked cast acrylic commercially available from Aristech Corp. under the tradename/product number Acrylic 1-300 was ground to 30/40 mesh size. The composite side 20/30 mesh, nano-structure side 30/40 mesh and acrylic side 30/40 mesh size were blended in 1:1 ratio with nano-structure side 16/20 mesh size creating a 16/40 mesh size.

Example 6

FIG. 7

The powdered melamine compound commercially available from BIP under tradename/product number Melmex MF B10/B11 was blended in a ratio as 65-35% by weight with alpha cellulose which is commercially available from JRS under tradename/product number Arbocel/BWW40 and compression molded at a temperature of 300° F. at a pressure of 500 tons psi. The resulting mixture was allowed to cool for 1 day and was then ground in a Reduction Engineering disc mill grinder to a 30/40 mesh size. Separately, a urea compound commercially available from BIP under tradename/product number Beetle GXT UF A-10 was added in the amount of 1,000 grams was blended by weight with a nano-sized montmorillonite polymer grade clay commercially available from Nanocor, Inc. under tradename/product number Nanomer PGV in the amount of 10 grams. The resulting blend was compression molded at a temperature of 300° F. and a pressure of 500 tons psi in a hydraulic compression molding press. The blend was allowed to cool for 1 day and was then ground to a 40/60 mesh size. The composite side and the nano-structure side were blended in a 1:1 ratio creating a 30/60 mesh size blend to which a glass oxide cullet or alox commercially available from alox—Strategic Materials, Inc. and glass frit—Exolong-ESK Company Glass under tradename/product numbers alox—320 grit and glass frit—80— was added in the amount of 20% by weight.

Example 7

FIG. 8

A toluene diisocynanate based urethane liquid polymer which was commercially obtained from Polyurethane Specialties Co. under tradename/product number PMS 1065 was placed in a polymer 55 gal. drum in the amount of 55 gals. Two heater bands were attached to the polymer drum, one on the top and one on the bottom, and the polymer was heated for 1 hour to reach a temperature in the range of 95°-100° F. Nano-sized montmorillonite clay was commercially obtained from Nanocor, Inc. undertradename Nanomerand product number PVG was added to the polymer at a rate of ½% by weight or 2.25 lbs./450 lb. drum. A Sharpe ½ HP drum blender was used for 1 hour to blend the Nanomer and the polymer for 1 hour. After the first drum reached the desired temperature, a second drum was heated and blended with Nanomer in the same way. The polymer and Nanomer blend was then pumped to Acrison mixer model no. 4048D021 volumetric feeder manufactured by Ronco at a rate of 8.5-9 lbs./min. by a Moyno pump model no. 1000. 2,200 lbs. of 320 grit aluminum oxide were added to a grit feed at a rate of 38 lbs./min. The Acrison mixer contained a meter auger and an Intromiter mixer. A 3 in. variable speed metering auger moves the blended polymer and aluminum oxide from the Acrison to a vertical auger. A mixture of water and Technocell 200 cellulose which is 8.5% by weight cellulose and 91.5% by weight water is extruded in a 6 in. auger with mixing pins to feed water and cellulose into the polymer blend in the extruder at the rate of 1.83 lb./min. The cellulose and polymer blend is then fed into a forming die having dimensions of 6"×4"2". The material extruded from the die is fed to a conveyor belt where it is formed into a continuous sheet 2 ft. wide and ½ in. thick. The material sets up while on the conveyor for a period of 10 mins. At the end of the conveyor the material was cut into 4 ft. lengths and stacked onto a pallet where it was cured for 48 hrs. at a temperature of 65° F. After this cure period, the material was cut to dimensions of 6"×8" and then packaged. A magnified photograph showing the cellular structure of the resulting pad is shown in FIG. 10. The resulting pad had a bulk density of 45 lbs./ft.$^3$.

Comparative Tests

Various tests were conducted to compare characteristics of the composite abrasives made in Examples 1, 2, and 3 with the prior art Type I, II, III, V, X, and VII plastic blast mediums shown in Table 1 which are commercially available from U.S. Technology Corporation located at 220 7$^{th}$ St. SE Canton, Ohio 44702 and which are defined in MILSPEC 85891A.

TABLE 1

| Type | Description |
| --- | --- |
| Type I: | a polyester compound |
| Type II: | a urea-formaldehyde compound with cellulose filler |
| Type III: | a polymerized melamine molding with alpha cellulose filler |
| Type V: | an acrylic compound |
| Type VII: | a starchgrafted acrylic compound |
| Type X: | a cross linked acrylic compound |

Test Series 1

Breakdown Rate

A comparison of the breakdown rates of the commercially available blast media was made with that of the new media as prepared by Examples 1-3.

The particle size distribution of each of the blast media was determined before and after blasting and the results summarized in Table 2. The breakdown rates were calculated on both the commercial particle size distribution and on the 80 mesh screen.

The breakdown rate was determined by using a blast cabinet. 3'×3'×4' (w×h×d) without the vacuum return. At the bottom of the blast cabinet was a clap, which when opened, allowed all of the contents of the blast cabinet to be drained. The pressure pot, 1 cubic foot, was equipped with 2 glass view ports to verify that all of the media had been consumed. The air feed line was 1" I.D., and the media flow valve was of the guillotine type. Over the pressure pot was a hopper without screens. The media was manually poured into the pressure pot via the hopper. The blast hose was 1" I.D., and about 8' long. The nozzle was ¼" straight barrel.

An aluminum plate was placed at 10 inches and 80° to the blast nozzle. The pressure at the nozzle was measured by inserting the needle gauge into the rubber hose directly behind the nozzle such that the needle was in the direction of the air flow. The media flow rate was measured by timing the consumption of 10 lbs. of abrasive media at the desired nozzle pressure. The particle size of the unblasted media was determined as was that of the media after 4 blast cycles.

The breakdown rate was calculated to military specification MIL-P-85891AS. the particle size distribution of Example 1 was narrow in the ground media as seen in Table 2. About 78% of the media was on the 30, 40, and 50 mesh screens. After 4 cycles, the mean particle size shifted by one screen. About 92% was on the 40, 50, 60, and 80 mesh screens. The breakdown rate of Example 5 compared favorably to the breakdown rates of 13% in the pro. The highest breakdown rate is that of wheat starch blast media at 15% and the lowest is Example 2 at 4%.

Comparisons based solely on the new media size can be deceiving since most blast equipment only separates particles finer than 80 mesh from the blast medium. Based on breakdown below 80 mesh, the 4.4% breakdown of Example 2 compares favorably to the other media. The highest breakdown rate being 1, 3, and 7 at 15% and the lowest being Example 2 at 4%. The other media have breakdown rates of about 6-13%.

Almen Arc Height

In measuring the almen arc height, a block capable of holding 3 almen strips was used. Clad aluminum, 0.032" thick almen strips were used with a digital almen gauge. The pressure at the nozzle was measured by inserting a needle gauge into the rubber hose directly behind the nozzle such that the needle was in the direction of the air flow. The media flow rate was measured by timing the consumption of 10 lbs. of abrasive media at the desired nozzle pressure. The arc of 3 unused almen strips was measured and recorded. The strips were placed into the block and secured without over tightening the holding screws.

For the single pass almen arc height, the following procedure was used. Immediately following the coating removal rate test and without interruption, the almen block containing 3 almen strips was exposed to the blast using the same motion and technique used to remove the coating. The almen strips were removed form the block, wiped clean with a dry cloth and the arc remeasured and recorded.

For the saturation almen arc height, the almen block was blasted for 10 seconds at the preset pressure and media flow rate, at 7" stand-off and at 70°-85° impingement angle. The arc of each almen strip was measured and the almen strips were replaced in the block. These steps were repeated until no further significant change in almen arc was recorded.

Almen arc height is a measure of the residual stresses after blasting. The shot peening effect is detrimental to most aircraft skins. Therefore, the lower the almen arc height the better. Table 2 is a comparison of the almen arc heights of Examples 1-3 with various prior art compositions. Examples 1-3 of the present invention compared very favorably with the softer prior art compositions.

Almen strips were made form 2024-T3 clad aluminum.

Coating Removal Rate

The coating removal rate was determined using a blast cabinet, 540×3'×5' (w×h×d), with vacuum return. At the bottom of the cyclone was a hopper with a clap, which when opened allowed all of the contents of the hopper to be drained. During blasting, the media and dust were separated in the cyclone. The media was collected in the hopper and the dust was collected in the bag house. Over the pressure pot 3 cubic feet, was a hopper without screens. The media was manually filled into the hopper. The air feed line was 1' I.D., and the media flow valve was of the guillotine type. Over the pressure pot was a hopper without screens. The media was manually poured into the pressure pot via the hopper. The blast hose was 1" I.D. and about 8' long. The nozzle was ¼" straight barrel.

Panels with mil-C-83286 top coat and mil-P-23377 primer were used. The pressure at the nozzle was measured by inserting the needle gauge into the rubber hose directly behind the nozzle such that the needle was in the direction of the air flow. The media flow rate was determined by timing the consumption of 10 lbs. of abrasive media at the desired nozzle pressure. Maintaining the nozzle at 10" and at an 80° angle, the paint was removed to the bare metal. As much paint as could be removed completely within one minute was removed. Without stopping, the single pass almen height samples were blasted. Both the surface area of paint removed as well as the exact time required to remove the paint was recorded in Table 2.

All coating removal rate tests were performed using a ¼ inch diameter nozzle. This is smaller than the nozzles used to remove coatings from aircraft parts and components. Since the coating removal rate is dependent on the surface area of the nozzle, all other parameters remaining constant, the coating removal rate will increase by a factor of 4 when the nozzle diameter is doubled.

The coating removal rate of the humidified media did not change, indicating that the media is stable when stored under 95% R.H. at 33° C. conditions. This is significant in that coating removal rate is generally the most sensitive property to water uptake. The almen arc height and hardness values will decrease, but the coating removal rate decreases before any changes in hardness or almen arc height are observed. Since none of the properties changed after 36 hours to high humidity conditions, the blast properties of the media are stable under most environmental conditions.

Surface Roughness

The following are the surface roughness measurements which were obtained from panels on which the coating removal rate test was performed at 35 psi as shown in Table 2.

The RA average surface roughness of clad aluminum panels stripped using Examples 1-3 are shown. This compared favorably with the prior art compositions. Since the surface roughness is so low, the cladding is disturbed the least with Examples 1-3 than with the other prior art media. Also, since clad can be repolished after the paint was stripped, it should also be possible to repolish the clad substrate after stripping paint with Examples 1-3.

Water Uptake Rate

In order to measure the water uptake rate of various blast media, a glass indicator was used as a humidity chamber. A watch glass was used to expose the media to the environment inside the desiccator. Potassium sulfate ($K_2SO_4$) was used to maintain the humidity within the desiccator. A 25 g. sample of the media was weighted and placed into a porcelain evaporating dish and placed in the desiccator for 13 hours, after which the media was removed and reweighed.

Test Series 2

The tests described with respect to Test Series 1 above were repeated on the blast media shown in Table 3. Somewhat different test conditions were also used which are shown in Table 3. The results of these tests are also shown in Table 3.

It will be appreciated that a polymeric blast media has been described which efficiently and cost effectively removes organic coatings from substrates.

It will also be appreciated that polymeric blast media has been described which allows removal of organic coatings from substrates.

It will also be appreciated that a polymeric blast media can be used to remove standard abrasive organic coatings without substantial risk of damage to sensitive metal or composite substrates.

It will also be appreciated that a polymeric blast media has been described which has a high degree of durability.

It will also be appreciated that a polymeric blast media has been described which has favorable surface roughness, almen arc height, and water absorbence characteristics.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method of making a sanding pad for removing an organic coating from a substrate comprising the steps of:
    (a) blending a liquid polymeric material with a nano-clay material to produce a first blend;
    (b) blending a cellulosic material with said first blend to produce a second blend; and
    (c) extruding the second blend to form a continuous sheet of abrasive material.

2. The method of claim 1 further comprising the step of cutting the continuous sheet of abrasive material into a plurality of individual pads.

3. The method of claim 1 further comprising the step of adding an abrasive material to the first blend.

4. The method of claim 3 wherein the abrasive material is aluminum oxide.

5. The method of claim 1 wherein in step (a) the nano-clay is montmorillonite.

6. The method of claim 1 wherein in step (a) the polymeric material is a polyurethane.

7. The method of claim 1 wherein in step (b) the cellulosic material is alpha cellulose.

8. The method of claim 1 wherein in step (c) the second blend is foam extruded.

9. The method of claim 1 further comprising the step of heating the polymeric material.

10. A product of the method of making a sanding pad for removing an organic coating from a substrate comprising the steps of:
    (a) blending a liquid polyurethane with a nano-clay material to produce a first blend;
    (b) blending a cellulosic material with said first blend to produce a second blend; and
    (c) extruding the second blend to form a continuous sheet of abrasive material.

11. A product of the method of making a sanding pad for removing an organic coating from a substrate comprising the steps of:
    (a) blending a liquid polymeric material with a nano-clay material to produce a first blend;
    (b) blending alpha cellulose with said first blend to produce a second blend; and
    (c) extruding the second blend to form a continuous sheet of abrasive material.

12. A product of the method of making a sanding pad for removing an organic coating from a substrate comprising the steps of:
    (a) blending a liquid polymeric material with a nano-clay material to produce a first blend;
    (b) blending a cellulosic material with said first blend to produce a second blend; and
    (c) foam extruding the second blend to form a continuous sheet of abrasive material.

13. The product of the method of claim 8 further comprising the step of heating the polymeric material.

* * * * *